3,702,337
PREPARATION OF ORGANOTHIOBORATES
Jean-Marc Lalancette, 2261 Bachand St.,
Sherbrooke, Quebec, Canada
No Drawing. Filed Mar. 2, 1970, Ser. No. 15,966
Int. Cl. C07f 5/04
U.S. Cl. 260—462 R      4 Claims

ABSTRACT OF THE DISCLOSURE

Organothioborates are prepared by reacting sulfurated sodium or potassium borohydride with from 50 to 100 percent excess of a mercaptan in petroleum ether or other low boiling diluent, such as hexane, heptane or benzene. The products of the reaction in addition to the organothioborate are insoluble alkali metal polysulfide and soluble disulfide. The insoluble polysulfide is filtered off. The organothioborate is then separated from the disulfide by distillation of the filtrate.

---

This invention relates to a new synthesis of organothioborates, which are useful for the preparation of thioacetals. Prior to my present discovery, the preparation of organothioborates was difficult and often resulted in poor yields, or involved intermediates such as $B_2S_3$ which are not readily available or easily prepared. Known methods have been:

(1) The reaction of a mercaptan with boron sulphide $$B_2S_3 + 6RSH \rightarrow 2(RS)_3B + 3H_2S$$

Lalancette et al., Can. J. Chem. 42, 2903 (1964)

(2) The reaction of boron trichloride with a mercaptan

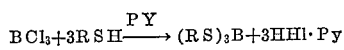

(Py=pyridine) Mikhailov et al., Bull. Acad. Sci., USSR, Eng. Trans., 7, 1143 (1962)

(3) The reaction of boron halides with the silver salt of a mercaptan

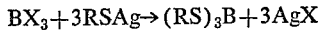

Boubeau et al., Z. anorg. allg. Chem, 270, 16 (1952)

While fairly good yields of organothioborates can be obtained by reaction 3, above, this is an extremely expensive method due to the high cost of silver.

My present method involves the reaction of sulfurated sodium or potassium borohydride and a mercaptan and proceeds according to the general equation:

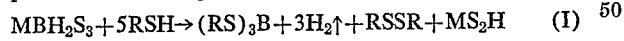

wherein M is sodium or potassium.

Sulfurated sodium borohydride is easily prepared from the readily available starting materials, soduim borohydride and sulfur, as described in the publication of J M. Lalancette et al., Canadian Journal of Chemistry, vol. 46, p. 2754 (1968).

The sulfuration of the borohydride is an extremely simple reaction: a mixture of $NaBH_4$ (1 mole) and sulfur (3 moles) is treated by anhydrous tetrahydrofuran and the solvent is evaporated under vacuum after a short contact. This sulfurated hydride is then treated with an excess of the selected mercaptan in petroleum ether or any other low boiling inert hydrocarbon diluent, such as hexane, benzene, heptane, etc. The use of a stoichiometric amount of mercaptan gives rather low yields of orthothioborate (10–20%) but a 100% excess of mercaptan brings the yield in the 50–60% range. The sodium polysulfide is insoluble in the inert diluent and the organic fraction can be filtered off. Due care must be exercised in the course of this filtration since organothioborates are very hydroscopic. The organothioborate is then separated from the disulfide by distillation and can be used for the preparation of the thioacetal. Reaction times are generally 1–12 hours, and temperatures of 20–100° C. are satisfactory.

The sequence of reactions besides giving a new preparative method of organothioborates, offers a new, simple and rapid technique of preparation of thioacetals, under neutral conditions. The side reactions resulting from acid catalysis, as required by the standard methods of preparation of thioacetals, can be avoided with this new procedure.

The reaction of the organothioborates of this invention with ketones to produce thioacetals proceeds as follows:

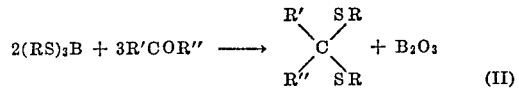

A very wide range of organothioborates may be prepared by the method of my invention. Thus, any mercaptan, RSH, having no functional group that can react with either $NaBH_2S_3$ or $B(SR)_3$ can be used to produce corresponding organothioborates by my method. Mercaptans containing more than one sulfur atom may be used. Mercaptans where R is a simple aliphatic or aromatic group give especially satisfactory yields of the corresponding organothioborates. Examples of these groups include: methyl, ethyl, n-propyl, isopropyl, n-butyl, sec-butyl, isobutyl, tert-butyl, pentyl, hexyl, cyclohexyl and phenyl, benzyl, tolyl, cumyl, xylyl, 2-methyl cyclohexyl, 3-methyl cyclohexyl and various substituted cyclohexyl, cyclopentyl, 2-methyl cyclopentyl and various substituted cyclopentyl, cyclobutyl, cyclopropyl.

Also operative are mercaptans bearing a halogen, an ester or amide group, CN, or $NO_2$ groups. Mercaptans which bear olefinic or acetylenic unsaturation may also be used, such as those containing acetylene, ethylene, propylene, and butylene groups. Examples include: o, m, and p-chlorobenzyls and similar derivatives with fluorine, bromine and iodine, benzyl group bearing either a CN, $NO_2$, ester, halogen or any combination of these functional groups in ortho, meta or para positions, propargyl mercaptan and cinnamyl mercaptan.

Not operative are those mercaptans which have extremely high steric hindrance such as 2,6-ditertiarybutylthiophenol and to a lesser degree, 2-tertiarybutylphenol. Operative aromatic mercaptans may be represented by the formula

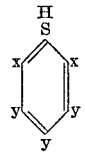

where $x$ represents hydrogen, ester, amide, halogen, cyanogen, $NO_2$, olefinic, acetaylenic, and straight chain alkyl groups and $y$ represents hydrogen, ester, amide, halogen, cyanogen, $NO_2$, straight chain alkyl groups, and branched chain alkyl groups.

My invention is further illustrated by the following specific examples:

EXAMPLE 1

In a dry 500 ml. flask, a mixture of 7.6 g. (0.2 mole) of sodium borohydride and 19.2 g. (0.6 mole) of sulfur was stirred with 50 ml. of anhydrous tetrahydrofuran (slow addition). After the initial reflux had subsided, heat was applied, for a total reflux time of 1½ h. The tetrahydrofuran was then evaporated under vacuum at room temperature and 200 ml. of dry petroleum ether, B.P. 30–60° was added to the hydride, with 137 g. (1.8 moles) of 1-propanethiol. The reaction mixture was then refluxed overnight.

The crude mixture was then filtered on a carefully dried sintered glass filter (medium porosity). It is advantageous to keep the system dry during the filtration, using a stream of dry nitrogen flowing through an inverted funnel over the filter. After evaporation of the solvent at atmospheric pressure under dry nitrogen, the residue (56.0 g.) was then fractionated under vacuum. The first fraction was di-n-propyl disulfide, 20.3 g.; B.P. 44°/0.5 mm., $n_D^{29}$ 1.4980. Reported for di-n-propyl disulfide, B.P. 193.5°/750 mm., $n_D^{20}$ 1.4981. The second fraction, 25.8 (55% yield based on NaBH$_4$) was n-propyl orthothioborate, B.P. 110–118°/0.6 mm., $n_D^{29}$ 1.5341. Reported (5) for n-propyl orthothioborate, B.P. 110°/0.6 mm., $n_D^{25}$ 1.5346. This second fraction had an infrared showing the typical B-S band at 910 cm.$^{-1}$. Similar results are obtained using hexane, heptane or benzene in place of petroleum ether.

EXAMPLE 2

The results obtained by reacting other mercaptans with sulfurated sodium borohydride by the procedure described in Example 1 are given in the following table.

| Mercaptan R | Percent RSH, over theory | Reaction Time, hrs. | Temp., degrees | (RS)$_3$B yield (percent) | B.P. |
|---|---|---|---|---|---|
| Ethyl | 100 | 6 | 60 | 56 | 90°/.75 mm. |
| Isopropyl | 100 | 6 | 60 | 58 | 82°/0.70 mm. |
| n-Butyl | 50 | 6 | 69 | 52 | 145°/0.72 mm. |
| Phenyl | 50 | 6 | 60 | 44 | (¹) |

¹ M.P. 144°.

EXAMPLE 3

In a dry 250 ml. flask, 6.7 g. (0.93 mole) of butanone were mixed with 16.1 g. (0.82 mole) of ethyl orthothioborate which was prepared according to the procedure described in Example 1. Upon warming, the mixture assumed a gel-like appearance. After a 1 h.-contact, the mass was extracted with petroleum ether. The boric anhydride was filtered off, the solvent evaporated, and the crude thioacetal distilled. The main fraction was the ethyl thioacetal of butanone, B.P. 73°/0.15 mm., $n_D^{28}$ 1.4959. Reported, B.P. 205–208°/750 mm., $n_D^{25}$ 1.4955. The yield of thioacetal was 86%. The reaction can be reproduced with other simple orthothioborates, such as propyl, butyl, and pentyl, with similar yields.

EXAMPLE 4

The following ketones or aldehydes of the formula R'COR" were reacted with organothioborates of the formula B(SR)$_3$, to give thioacetals according to Reaction II. The procedure described in Example 3 was followed in each instance.

| R'COR" | R | Boiling point ° C. (mm. Hg) | $n_D^{25}$ |
|---|---|---|---|
| Benzaldehyde | Ethyl | 118–120 (3.0–3.4) | 1.5723 |
| p-Tolualdehyde | do | 125–130 (0.35) | 1.5730 |
| p-Chloro-benzaldehyde | do | 140–144 (0.3–0.5) | 1.5819 |
| p-Nitro-benzaldehyde | do | 173–176 (1.0) | 1.5980 |
| n-Butanal | do | 219–220 (750) | 1.4967 |
| i-Butanal | do | 216 (750) | 1.4968 |
| Propanal | do | 196–198 (750) | 1.5002 |
| Benzophenone | do | 165–171 (0.7–0.9) | 1.6165 |
| Butanone | do | 205–208 (750) | 1.4955 |
| m-Nitro-benzaldehyde | n-Pentyl | 213 (0.85) | 1.5496 |
| Benzaldehyde | n-Butyl | 133–135 (0.3) | 1.5453 |

I claim:
1. The method for preparing an organothioborate which comprises reacting a sulfurated alkali metal borohydride of the formula MBH$_2$S$_3$, wherein M is sodium or potassium, with at least a stoichiometric amount of a mercaptan in a low boiling inert hydrocarbon diluent thereby forming a solution of an organothioborate and an organic sulfide containing precipitated alkali metal polysulfide, separating the precipitated polysulfide by filtration to obtain a filtrate which is a solution of an organothioborate and an organic sulfide, and separating the organothioborate from the organic sulfide by distillation, said mercaptan being selected from the group consisting of lower alkyl mercaptans, phenyl mercaptan and benzyl mercaptan.

2. The method as claimed by claim 1 wherein the mercaptan is phenyl mercaptan.

3. The method as claimed by claim 1 wherein the mercaptan is benzyl mercaptan.

4. The method as claimed by claim 1 wherein the mercaptan is ethyl mercaptan.

References Cited

UNITED STATES PATENTS 3,558,686   1/1971   Young _____ 260—462

FOREIGN PATENTS 1,079,634   4/1960   Germany _____ 260—462 R

OTHER REFERENCES

Steinberg: Organoboron Chemistry, pp. 821–829 (1964).

Lalancette et al.: Can. J. Chem. 46, 2754 (1968).

LEON ZITVER, Primary Examiner

L. B. DE CRESCENTE, Assistant Examiner

U.S. Cl. X.R.

260—465, 609 R, 609 E, 607 R